United States Patent
Saito et al.

(10) Patent No.: US 10,804,792 B2
(45) Date of Patent: Oct. 13, 2020

(54) CONTROL DEVICE OF ROTARY ELECTRIC MACHINE

(71) Applicant: Honda Motor Co., Ltd., Tokyo (JP)

(72) Inventors: Takeo Saito, Saitama (JP); Yasuhiko Kondo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/535,062

(22) Filed: Aug. 7, 2019

(65) Prior Publication Data

US 2020/0052577 A1 Feb. 13, 2020

(30) Foreign Application Priority Data

Aug. 9, 2018 (JP) .................................. 2018-150234

(51) Int. Cl.
| | |
|---|---|
| H02M 1/32 | (2007.01) |
| H02P 3/18 | (2006.01) |
| H02M 3/156 | (2006.01) |
| B60L 50/15 | (2019.01) |
| H02M 7/12 | (2006.01) |

(52) U.S. Cl.
CPC ............... *H02M 1/32* (2013.01); *B60L 50/15* (2019.02); *H02M 3/156* (2013.01); *H02M 7/12* (2013.01); *H02P 3/18* (2013.01)

(58) Field of Classification Search
None
See application file for complete search history.

(56) References Cited

U.S. PATENT DOCUMENTS

| | | | | |
|---|---|---|---|---|
| 5,495,908 A | * | 3/1996 | Obara ..................... | B60L 50/51 180/65.8 |
| 2011/0054742 A1 | * | 3/2011 | Yamashita ........... | B62D 5/0463 701/43 |

(Continued)

FOREIGN PATENT DOCUMENTS

| | | |
|---|---|---|
| JP | 2004222362 | 8/2004 |
| JP | 3928559 | 6/2007 |

(Continued)

OTHER PUBLICATIONS

Office Action of Japan Counterpart Application, with English translation thereof, dated Feb. 12, 2020, pp. 1-8.

*Primary Examiner* — Bentsu Ro
(74) *Attorney, Agent, or Firm* — JCIPRNET (57) ABSTRACT

A control device of a rotary electric machine capable of preventing occurrence of electrical resonance when a conversion operation abnormality of a DC voltage converter occurs is provided. In a case that the DC voltage converter stops a conversion operation and the conversion operation abnormality that input/output voltages become equal occurs, when a vehicle speed proportional to an electric motor rotation number exceeds a torque limit start vehicle speed, i.e., when the electric motor rotation number exceeds a torque limit start rotation number, a torque limit control for limiting an output torque of the electric motor is executed. The torque limit start vehicle speed is set to a vehicle speed corresponding to a lower limit frequency of a predetermined frequency range where there is a high likelihood of an electrical resonance occurring in the DC voltage converter when the conversion operation abnormality occurs.

11 Claims, 8 Drawing Sheets

(56) References Cited

U.S. PATENT DOCUMENTS

| | | | | |
|---|---|---|---|---|
| 2012/0139460 A1* | 6/2012 | Senkou | ............... | H02P 29/032 |
| | | | | 318/400.02 |
| 2017/0129478 A1* | 5/2017 | Minegishi | ............... | B60L 50/16 |
| 2018/0281596 A1* | 10/2018 | Arakawa | ............... | B60L 9/18 |
| 2019/0341871 A1* | 11/2019 | Nishibata | ............... | H02M 7/53871 |

FOREIGN PATENT DOCUMENTS

| | | |
|---|---|---|
| JP | 2012070473 | 4/2012 |
| JP | 2012205386 | 10/2012 |
| JP | 2012240665 | 12/2012 |
| JP | 2013027121 | 2/2013 |

* cited by examiner

CONTROL DEVICE OF ROTARY ELECTRIC MACHINE

CROSS REFERENCE TO RELATED APPLICATIONS

This application claims the priority benefit of Japanese Patent Application No. 2018-150234, filed on Aug. 9, 2018. The entirety of the above-mentioned patent application is hereby incorporated by reference herein and made a part of this specification.

BACKGROUND

Technical Field

The disclosure relates to a control device of a rotary electric machine operating as an electric motor and/or a generator, and more particularly to a control device that includes a direct current (DC) voltage converter performing a conversion operation on a DC voltage and performs a failsafe operation when an abnormality related to the DC voltage converter occurs.

Description of Related Art

Patent Document 1 (Japanese Patent No. 3928559) describes a voltage conversion device that includes a battery, an inverter converting an alternating current (AC) power output from a rotary electric machine serving as a generator into a direct current (DC) power, and a converter (DC voltage converter) provided between the battery and the inverter to convert a DC voltage. According to this voltage conversion device, when a failure of the converter occurs, in order to prevent an excessive DC voltage from being applied to a smoothing capacitor disposed between the inverter and the converter, a failsafe operation for reducing an amount of power generation of the rotary electric machine is executed at the time of failure of the DC voltage converter.

A direct current (DC) voltage converter is configured to include a series circuit including a reactor and a switching element (for example, a transistor) disposed between a battery side terminal connected to a battery and an inverter side terminal connected to an inverter, and, when a short-circuiting failure of the switching element occurs, the DC voltage converter stops a conversion operation, and the input and output DC voltages become equal. Also, in a control device that performs a failsafe operation in which a switching element is maintained in a closed state when an abnormality of a sensor attached to a DC voltage converter, for example, a sensor for detecting an output voltage or the like is detected, the DC voltage converter stops the conversion operation and input and output DC voltages are made equal by performing such a failsafe operation. Hereinafter, in the present specification, such an abnormality including the latter case is referred to as a "conversion operation abnormality" of a DC voltage converter.

DC voltage converters generally include a capacitor (corresponding to the smoothing capacitor of Patent Document 1) between the ground and each of the battery side terminal and the inverter side terminal, and particularly, since a relatively high voltage (about 600 V) is applied to the inverter side terminal, a large-sized capacitor with a high withstand voltage is required. Therefore, in order to meet the requirement for further downsizing of DC voltage converters, it is effective to set a capacitance of a capacitor to a minimum necessary value to reduce a size of the capacitor.

However, in a case that the above-described conversion operation abnormality occurs in a DC voltage converter using a downsized capacitor with a capacitance that has no problems at all in normal operation, when the rotary electric machine is operated at a relatively high rotation speed, there is a problem in that an electrical resonance occurs in the DC voltage converter, and a drive current of the rotary electric machine serving as an electric motor or an output current of the rotary electric machine serving as a generator becomes excessive.

In view of the above descriptions, the disclosure provides a control device for a rotary electric machine capable of preventing occurrence of the electrical resonance and maintaining an input current or an output current of an inverter connected to the rotary electric machine within an appropriate range when a conversion operation abnormality in a DC voltage converter occurs.

SUMMARY

In view of above, according to one aspect of the disclosure, a control device of a rotary electric machine is provided to include a battery, an inverter converting a direct current power supplied from the battery into an alternating current power to supply a drive power to the rotary electric machine, and a DC voltage converter provided between the battery and the inverter. In a case that the DC voltage converter stops a conversion operation and a conversion operation abnormality in which input and output voltages become equal occurs, when a rotation speed of the rotary electric machine exceeds a predetermined rotation speed, a torque limit control that limits an output torque of the rotary electric machine is executed. And, the predetermined rotation speed is set to a rotation speed corresponding to a lower limit frequency of a predetermined frequency range in which there is a high likelihood of an electrical resonance occurring in the DC voltage converter when the conversion operation abnormality occurs.

According to another aspect of the disclosure, a control device of a rotary electric machine is provided to include an inverter 33 converting an alternating current AC power generated by the rotary electric machine 2 having a power generation function into a direct current DC power, a battery 4 chargeable by the DC power output from the inverter 33, and a DC voltage converter 31 provided between the battery 4 and the inverter 33. In a case that the DC voltage converter 31 stops a conversion operation and a conversion operation abnormality in which input and output voltages become equal occurs, when a rotation speed NGEN of the rotary electric machine exceeds a predetermined rotation speed NETHR, a rotation speed reduction control that reduces the rotation speed NGEN of the rotary electric machine is executed, and the predetermined rotation speed NETHR is set to a rotation speed NMOTRL corresponding to a lower limit frequency fRL of a predetermined frequency range Rf in which there is a high likelihood of an electrical resonance occurring in the DC voltage converter when the conversion operation abnormality occurs.

DESCRIPTION OF THE EMBODIMENTS

Figure 1:
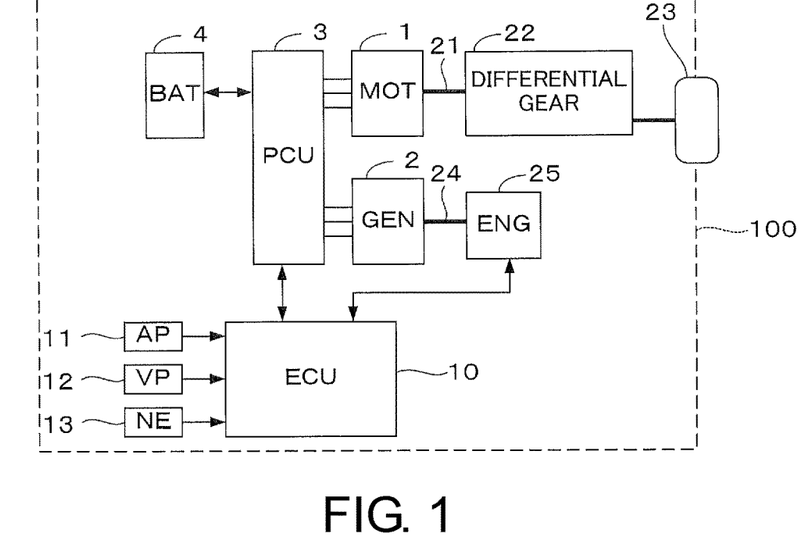
FIG. 1 is a block diagram showing a rotary electric machine and a control device thereof mounted on a vehicle according to one embodiment of the disclosure.

Hereinafter, embodiments of the disclosure will be described with reference to the drawings. FIG. 1 is a block diagram showing a rotary electric machine and a control device thereof mounted on a vehicle according to one embodiment of the disclosure. A vehicle 100 includes a rotary electric machine 1 (hereinafter referred to as a "electric motor (MOT) 1") mainly used as a vehicle drive source and a rotary electric machine 2 (hereinafter referred to as a "generator (GEN) 2") mainly used as a generator driven by an internal combustion engine (hereinafter referred to as an "engine"(ENG)) 25. The electric motor 1 has a function of performing regenerative power generation using the kinetic energy of the vehicle 100, and the generator 2 has a function of driving the engine 25 as an electric motor.

The electric motor 1 is configured such that an output shaft 21 thereof can drive drive wheels 23 of the vehicle 100 via differential gears 22. The generator 2 is configured such that an input shaft 24 thereof can be driven by the engine 25. The electric motor 1 and the generator 2 are electrically connected to a power control unit (hereinafter referred to as a "PCU") 3, and the PCU 3 is connected to a high voltage battery (BAT) 4 that outputs a relatively high voltage (for example, about 150 V). The PCU 3 is connected to an electronic control unit (hereinafter referred to as an "ECU") 10 to perform operation controls of the electric motor 1 and the generator 2 and perform controls of charging and discharging of the high voltage battery 4 in accordance with a control signal from the ECU 10.

The ECU 10 is connected to an accelerator sensor 11 for detecting an operation amount of an accelerator pedal (hereinafter referred to as an "accelerator pedal operation amount") AP of the vehicle 100, a vehicle speed sensor 12 for detecting a traveling speed (vehicle speed) VP of the vehicle 100, an engine rotation speed sensor 13 for detecting a rotation speed (hereinafter referred to as an "engine rotation number") NE of the engine 25, and other sensors (not shown) (for example, a current sensor, a voltage sensor, a temperature sensor, a sensor for detecting a rotation speed of the electric motor 1, a sensor for detecting a rotation speed of the generator 2, and the like which are provided in the PCU 3 to be described below), and detection signals from these sensors are supplied to the ECU 10. The ECU 10 controls operations of the electric motor 1, the generator 2 and the engine 25 according to the accelerator pedal operation amount AP and the vehicle speed VP, performs processing for detection of a predetermined abnormality, and executes a predetermined failsafe processing when an abnormality is detected. In the present specification, the term "rotation number" is used as a term synonymous with the "rotation speed" according to a conventional practice that the term "engine rotation speed" is referred to as the "engine rotation number." The rotation speed of the electric motor 1 and the rotation speed of the generator 2 are respectively referred to as an "electric motor rotation number NMOT" and a "generator rotation number NGEN."

Figure 2:
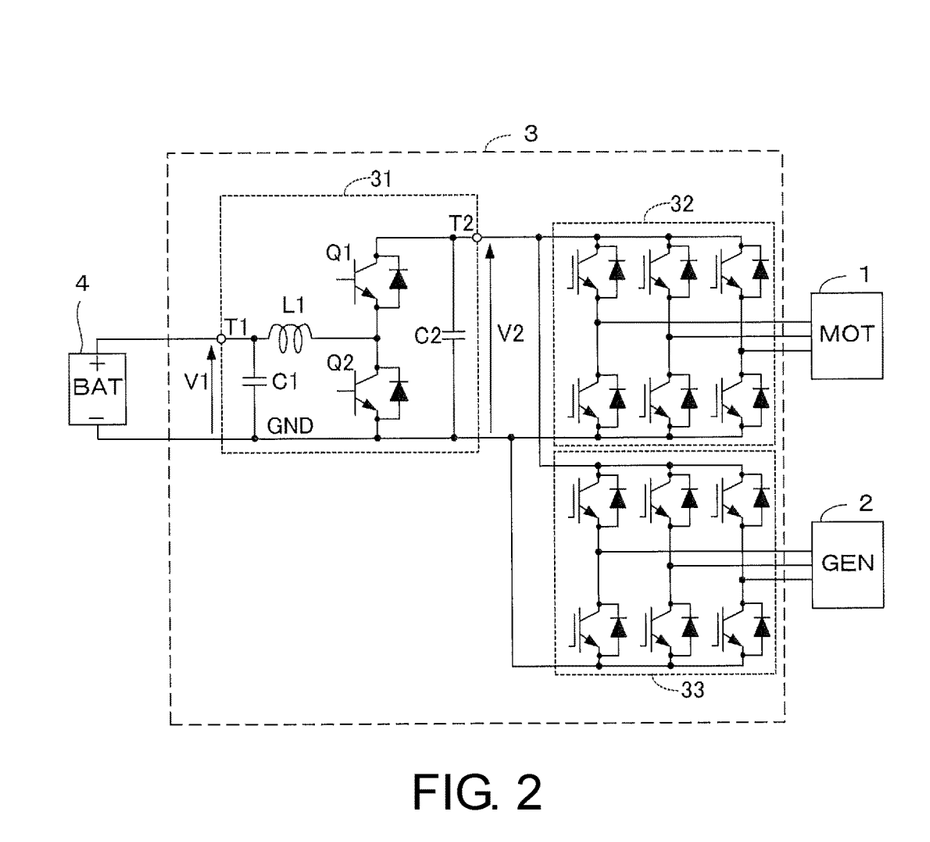
FIG. 2 is a diagram showing a configuration of a power control unit (PCU 3) shown in FIG. 1.

FIG. 2 is a diagram showing a configuration of the PCU 3 in which a DC voltage converter (hereinafter referred to as a "converter") 31, a first inverter 32, and a second inverter 33 are included. Configurations of the converter 31 and the first and second inverters 32 and 33 are known configurations as shown in, for example, Patent Document 1. However, in the present embodiment, the converter 31 includes a reactor L1 and two switching elements Q1 and Q2 and includes a capacitor C1 connected between a battery side terminal T1 and a ground GND and a capacitor C2 connected between an inverter side terminal T2 and a ground GND. The first and second inverters 32 and 33 are connected in parallel to the inverter side terminal T2 of the converter 31. Switching elements included in the converter 31 and the first and second inverters 32 and 33 are controlled in a switching manner by the ECU 10 and perform a voltage conversion operation to be described below. In the following description, a voltage at the battery side terminal T1 is referred to as a "low voltage side voltage V1," and a voltage at the inverter side terminal T2 is referred to as a "high voltage side voltage V2."

When the electric motor 1 is driven by a DC power supplied from the high voltage battery 4, the converter 31 boosts the low voltage side voltage V1 and outputs the high voltage side voltage V2 (for example, a voltage of about 600 V), and the first inverter 32 converts the high voltage side voltage V2 into an alternating current (AC) voltage to supply a drive current to the electric motor 1. When the regenerative power generation is performed by the electric motor 1, the first inverter 32 converts an AC generated voltage of the electric motor 1 into a DC voltage, and the converter 31 lowers the high voltage side voltage V2 to the low voltage side voltage V1 and supplies it to the high voltage battery 4.

When the power generation is performed by the engine 25 rotationally driving the generator 2, the second inverter 33 converts the AC generated voltage output from the generator 2 into a DC voltage, and the converter 31 lowers the high voltage side voltage V2 to the low voltage side voltage V1 and supplies it to the high voltage battery 4. When the vehicle 100 is decelerated, the generator 2 may be operated as an electric motor by a regenerative electric power of the electric motor 1 as necessary and rotationally drive the engine 25, and, in such a case, the second inverter 33 converts the high voltage side voltage V2 into an AC voltage to supply the drive current to the generator 2.

Figure 3:
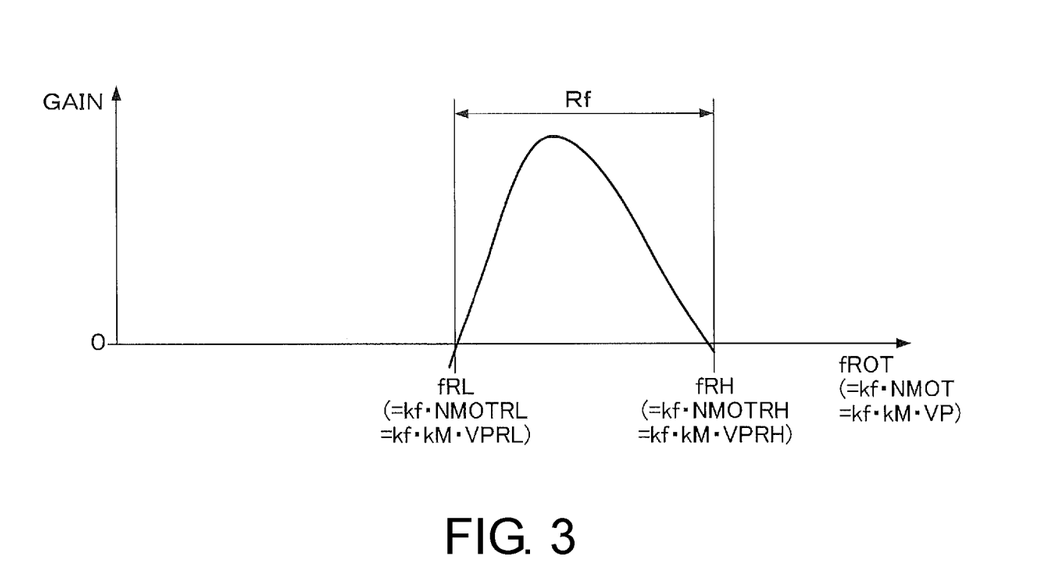
FIG. 3 is a diagram for explaining a predetermined frequency range (Rf) in which electrical resonance tends to occur in a direct current (DC) voltage converter when a conversion operation abnormality occurs in the DC voltage converter shown in FIG. 2.

FIG. 3 is a diagram for explaining a predetermined frequency range Rf in which electrical resonance occurs easily in the converter 31 when the conversion operation abnormality described above occurs in the converter 31. The horizontal axis of the diagram represents a frequency fROT that is proportional to the electric motor rotation number NMOT (proportional constant kf), and since the electric motor rotation number NMOT is proportional to the vehicle speed VP (proportional constant kM), the frequency fROT is also proportional to the vehicle speed VP (proportional constant kf×kM).

It is shown that occurrence of electrical resonance causes a gain of the converter 31 to be larger than 0 dB (1×) and be in an oscillation state. A lower limit frequency fRL of the predetermined frequency range Rf in which such electrical resonance occurs easily corresponds to a lower limit rotation number NMOTRL when converted to the electric motor rotation number NMOT and corresponds to a frequency range lower limit vehicle speed VPRL when converted to the vehicle speed VP. Also, an upper limit frequency fRH of the predetermined frequency range Rf corresponds to an upper limit rotation number NMOTRH when converted to the rotation number NMOT of the electric motor 1 and corresponds to a frequency range upper limit vehicle speed VPRH when converted to the vehicle speed VP. The lower limit frequency fRL is, for example, about 480 Hz, and the upper limit frequency fRH is about 800 Hz. The lower limit rotation number NMOTRL corresponding to the lower limit frequency fRL is about 4800 rpm, and the upper limit rotation number NMOTRH corresponding to the upper limit frequency fRH is about 8000 rpm.

In the present embodiment, in order to prevent occurrence of electrical resonance in the converter 31, at the time of occurrence of the conversion operation abnormality in the converter 31, when the electric motor rotation number NMOT exceeds the lower limit rotation number NMOTRL, a torque limit control for limiting an output torque of the electric motor 1 is executed. Also, at the time of occurrence of the conversion operation abnormality in the converter 31, when the generator rotation number NGEN exceeds the lower limit rotation number NMOTRL, a generator rotation number reduction control for reducing the generator rotation number NGEN is executed. Specifically, since the input shaft 24 of the generator 2 is directly connected to an output shaft of the engine 25, the generator rotation number reduction control is executed by reducing the engine rotation number NE.

Figure 4:
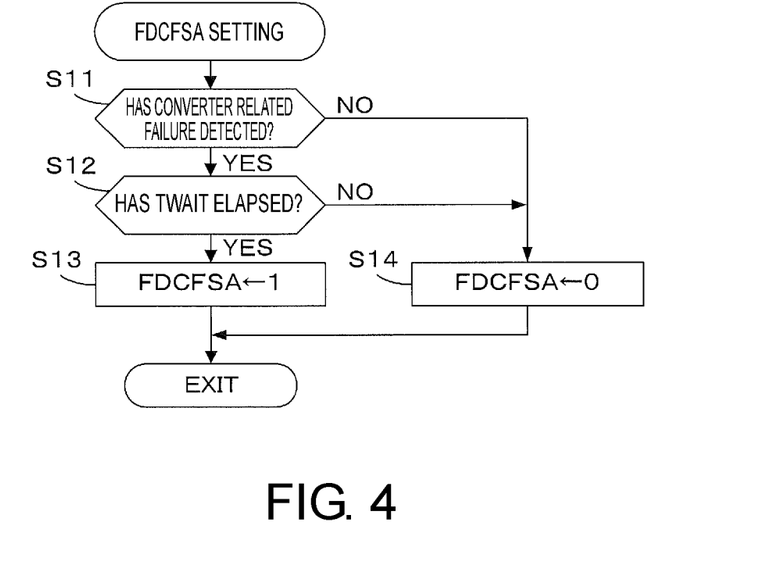
FIG. 4 is a flowchart of processing for confirming determination that a conversion operation abnormality of the DC voltage converter has occurred.

FIG. 4 is a flowchart of processing of confirming determination that a conversion operation abnormality of the converter 31 has occurred. This processing is executed at regular time intervals in the ECU 10. In step S11, it is determined whether or not a failure related to the converter 31 (hereinafter referred to as a "converter related failure") has been detected. The converter related failure includes a failure of the voltage sensor detecting the low voltage side voltage V1, a failure of the voltage sensor detecting the high voltage side voltage V2, a failure of the temperature sensor detecting a temperature of the switching elements Q1 and Q2, a failure of the sensor detecting a DC current flowing through the converter 31, or the like in addition to a failure of short-circuiting of the switching element Q1. When a failure other than the failure of short-circuiting of the switching element Q1 is detected, failsafe processing in which the switching element Q1 is maintained in an ON state (a closed state of the switch) is executed. Therefore, when the converter related failure occurs, the voltage conversion operation of the converter 31 is stopped and the low voltage side voltage V1 and the high voltage side voltage V2 becomes equal. As described above, in the present specification, this state is equivalent to a state that the "conversion operation abnormality" of the converter 31 has occurred.

If the answer to step S11 is negative (NO), a conversion operation abnormality flag FDCFSA is set to "0" (step S14). If the answer to step S11 is positive (YES), whether or not a predetermined waiting time TWAIT (for example, 100 msec) has elapsed from a time point at which the converter related failure was detected (a time point at which the answer to step S11 changed from negative (NO) to positive (YES)) is determined (step S12). While the answer is negative (NO), the processing proceeds to step S14, and if the answer to step S12 becomes positive (YES), the determination that the conversion operation abnormality has occurred is confirmed, and the processing proceeds to step S13 and the conversion operation abnormality flag FDCFSA is set to "1."

Figure 5:
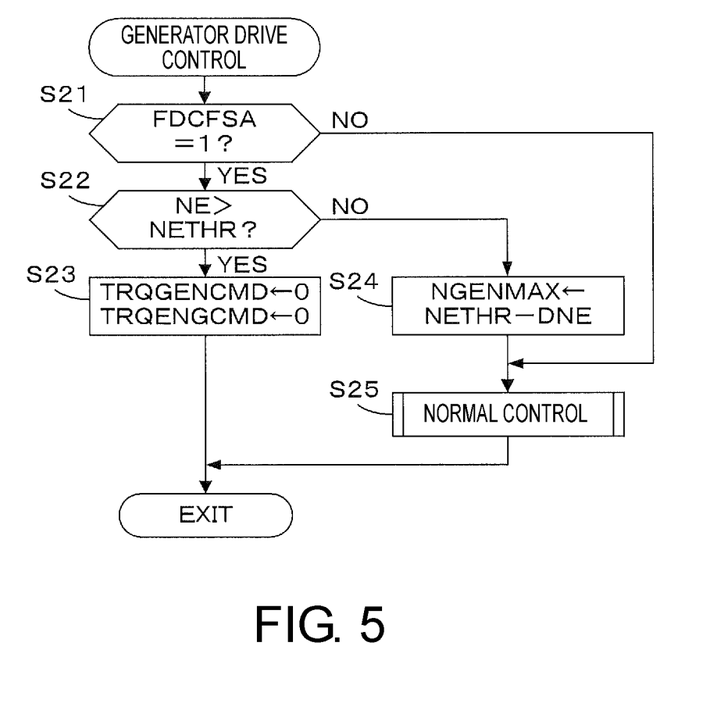
FIG. 5 is a flowchart of processing in which drive control of a generator shown in FIG. 1 is performed.
Figure 6:
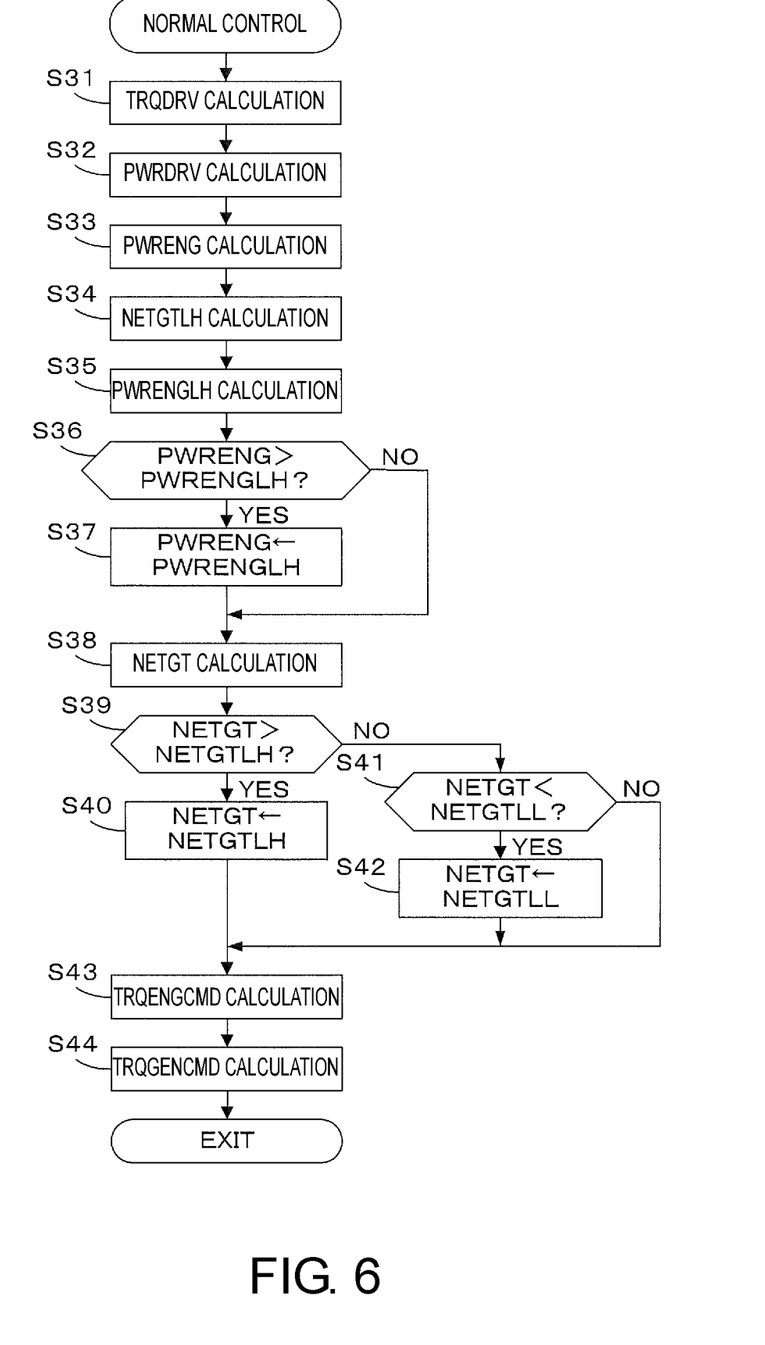
FIG. 6 is a flowchart of a normal generator drive control processing executed in the processing of FIG. 5.

FIG. 5 is a flowchart of processing in which drive control of the generator 2 is performed. This processing is executed at regular time intervals in the ECU 10. In step S21, whether or not the conversion operation abnormality flag FDCFSA is "1" is determined, and when the answer is negative (NO), a normal generator drive control shown in FIG. 6 is executed (step S25). If the answer to step S21 is positive (YES) and the conversion operation abnormality of the converter 31 has occurred, it is determined whether or not the engine rotation number NE is higher than a threshold rotation number NETHR that is equal to the lower limit rotation number NMOTRL shown in FIG. 3 (step S22).

If the answer to step S22 is positive (YES), both a generator required torque TRQGENCMD and an engine required torque TRQENGCMD are set to "0" (step S23). The generator required torque TRQGENCMD is normally set to a negative value to perform power generation.

If the answer to step S22 is negative (NO), an upper limit NGENMAX (hereinafter referred to as "NGEN upper limit NGENMAX") of the generator rotation number NGEN is set to a rotation number obtained by subtracting a margin rotation number DNE from the threshold rotation number NETHR (step S24), and the processing proceeds to step S25. When the conversion operation abnormality flag FDCFSA is "1," the NGEN upper limit NGENMAX set in step S24 is referred to in step S34 of FIG. 6 and is set to a target NE upper limit NETGTLH which is an upper limit of a target engine rotation number NETGT to be described below.

FIG. 6 is a flowchart of a normal control processing executed in step S25 of FIG. 5. In step S31, a target driving force TRQDRV of the vehicle 100 is calculated according to the accelerator pedal operation amount AP and the vehicle speed VP. The target driving force TRQDRV is basically set to increase as the accelerator pedal operation amount AP increases. In step S32, a vehicle required power PWRDRV that is necessary to obtain the target driving force TRQDRV is calculated based on the target driving force TRQDRV, the electric motor rotation number NMOT, a loss in the electric motor 1, or the like.

In step S33, a target engine output PWRENG represented by the electric power is calculated based on the vehicle required power PWRDRV, a loss in the generator 2, and a battery target power. The battery target power corresponds to a target value of power supplied from the high voltage battery 4 or power for charging the high voltage battery 4. In step S34, the upper limit NETGTLH of the target engine rotation number NETGT (hereinafter referred to as "target NE upper limit NETGTLH") is set to an upper limit NEMAX of the engine rotation number NE based on a specification of the engine 25 or the NGEN upper limit NGENMAX, whichever is smaller. When setting of the NGEN upper limit NGENMAX is performed in step S24 of FIG. 5, the target NE upper limit NETGTLH becomes equal to the NGEN upper limit NGENMAX.

Figure 7A:
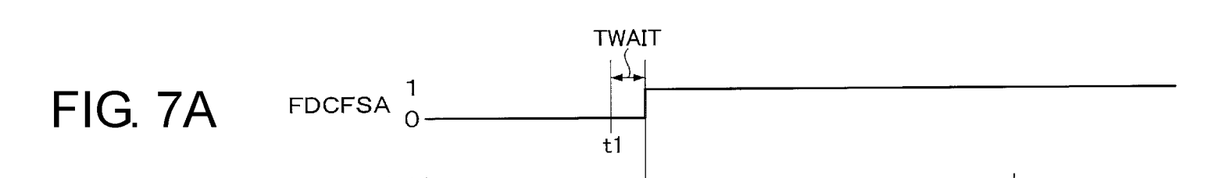
FIGS. 7A-7D are time charts showing an example of control operation according to the processing of FIGS. 5 and 6.
Figure 7B:
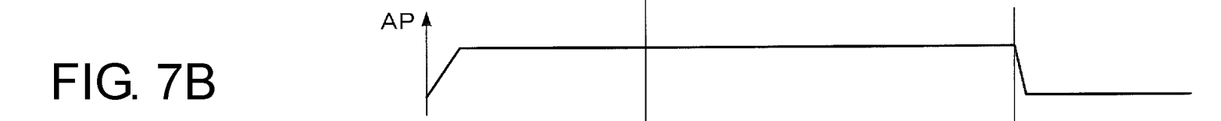
Figure 7C:
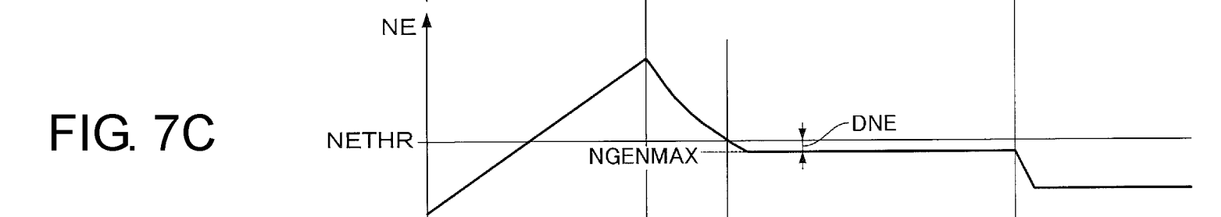
Figure 7D:
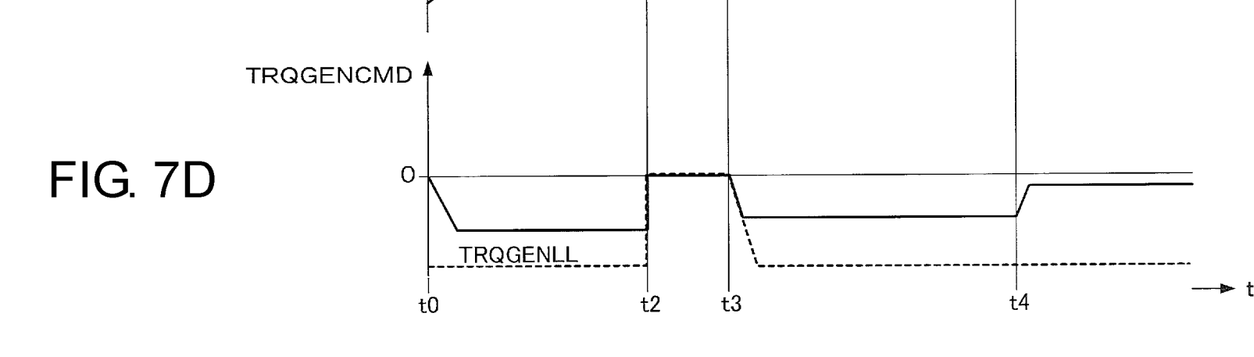

In step S35, a target engine output upper limit PWRENGLH is calculated by multiplying the target NE upper limit NETGTLH by a smaller one of a power generation torque limit TRQGENLMT of the generator 2 and the upper limit output torque TRQENGMAX of the engine 25. The power generation torque limit TRQGENLMT corresponds to an absolute value of a lower limit TRQGENLL (<0, see FIG. 7D) of the generator required torque TRQGENCMD. In step S36, it is determined whether or not the target engine output PWRENG calculated in step S33 is greater than the target engine output upper limit PWRENGLH calculated in step S35, and if the answer is determined to be positive (YES), the target engine output PWRENG is set to the target engine output upper limit PWRENGLH (step S37). If the answer to step S36 is negative (NO), the processing immediately proceeds to step S38.

In step S38, a target engine rotation number NETGT is calculated by retrieving an NETGT table which has been preset according to the target engine output PWRENG. In the NETGT table, a rotation number at which a fuel consumption rate of the engine 25 is minimized for realizing the target engine output PWRENG is set, and the target engine rotation number NETGT is set to increase as the target engine output PWRENG increases.

In steps S39 to S42, limit processing is performed such that the target engine rotation number NETGT has a value equal to or lower than the target NE upper limit NETGTLH and equal to or higher than a target NE lower limit NETGTLL. That is, when the target engine rotation number NETGT is higher than the target NE upper limit NETGTLH, the target engine rotation number NETGT is set to the target NE upper limit NETGTLH (steps S39 and S40), and when the target engine rotation number NETGT is lower than the target NE lower limit NETGTLL, the target engine rotation number NETGT is set to the target NE lower limit NETGTLL (steps S41 and S42). If the answers to steps S39 and S41 are negative (NO), the processing immediately proceeds to step S43. Further, the target NE lower limit NETGTLL is set to different predetermined values depending on whether the conversion operation abnormality flag FDCFSA is "1" or "0."

In step S43, the engine required torque TRQENGCMD is calculated by dividing the target engine output PWRENG by the target engine rotation number NETGT, and in step S44, the generator required torque TRQGENCMD is calculated such that the detected engine rotation number NE coincides with the target engine rotation number NETGT.

FIGS. 7A-7D are time charts showing an example of control operation according to the processing of FIG. 5 and FIG. 6 and shows transitions of the conversion operation abnormality flag FDCFSA, the accelerator pedal operation amount AP, the engine rotation number NE, and the generator required torque TRQGENCMD. The broken line in FIG. 7D indicates a transition of the lower limit TRQGENLL of the generator required torque TRQGENCMD.

When starting stepping on the accelerator pedal at a time t0, the target driving force TRQDRV and the vehicle required power PWRDRV (absolute value of the generator required torque TRQGENCMD) increase, and the target engine rotation number NETGT increases to increase the engine rotation number NE.

A converter related failure is detected at a time t1, and the conversion operation abnormality flag FDCFSA is set to "1" at a time t2 after a predetermined waiting time TWAIT has elapsed. At that time, since the engine rotation number NE is higher than the threshold rotation number NETHR, the generator required torque TRQGENCMD and the engine required torque TRQENGCMD are set to "0." As a result, since the engine rotation number NE gradually decreases and is lower than the threshold rotation number NETHR at a time t3, the NGEN upper limit NGENMAX is set to (NETHR−DNE) (step S24 in FIG. 5) and the generator drive control is executed. Since stepping on the accelerator pedal continues from the time t3 to a time t4, the engine rotation number NE is maintained at the NGEN upper limit NGENMAX, and after the time t4, the engine rotation number NE decreases as the accelerator pedal is released.

As described above, according to the processing of FIGS. 5 and 6, in a case that the conversion operation abnormality of the converter 31 has occurred, when the generator rotation number NGEN exceeds the threshold rotation number NETHR, the generator rotation number reduction control for reducing the generator rotation number is executed. Since the threshold rotation number NETHR is set to the generator rotation number (corresponding to the lower limit rotation number NMOTRL shown in FIG. 3) corresponding to the lower limit frequency fRL of the predetermined frequency range Rf in which there is a high likelihood of electrical resonance occurring in the converter 31 when a conversion operation abnormality occurs, the electrical resonance in the converter 31 can be avoided and a current flowing through the second inverter 33 can be prevented from becoming excessive while securing an operation of the generator 2 at a rotation number lower than the threshold rotation number NETHR.

Also, since the engine rotation number NE is controlled so that the generator rotation number NGEN does not exceed the threshold rotation number NETHR, the generator rotation number NGEN is prevented from exceeding the threshold rotation number NETHR again after the generator rotation number NGEN becomes equal to or lower than the threshold rotation number NETHR after the conversion operation abnormality has occurred.

Figure 8:
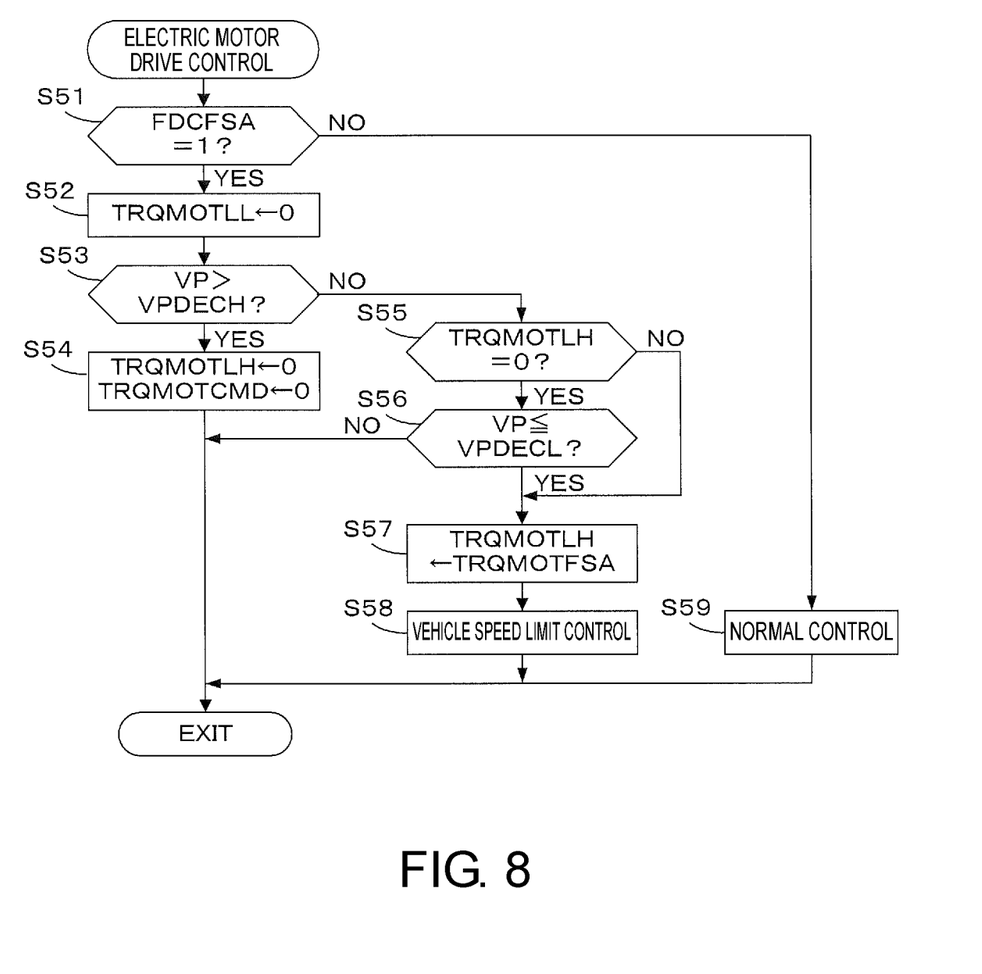
FIG. 8 is a flowchart of drive control processing of the electric motor shown in FIG. 1.

FIG. 8 is a flowchart of drive control processing of the electric motor 1. This process is executed at regular time intervals in the ECU 10. In step S51, whether or not the conversion operation abnormality flag FDCFSA is "1" is determined, and when the answer is determined to be negative (NO), a normal drive control of the electric motor 1 is executed (step S59). In the normal drive control, an electric motor required torque TRQMOTCMD is calculated to obtain the target driving force TRQDRV calculated according to the accelerator pedal operation amount AP and the vehicle speed VP, and a drive current control that is provided to the electric motor 1 is performed according to the electric motor required torque TRQMOTCMD.

If the answer to step S51 is positive (YES) and when the conversion operation abnormality of the converter 31 has occurred, an electric motor lower limit torque TRQMOTLL is set to "0" to prohibit a regenerative power generation (step S52). In step S53, it is determined whether or not the vehicle speed VP is higher than a start threshold of a torque limit control (hereinafter referred to as a "torque limit start vehicle speed") VPDECH which limits the output torque of the electric motor 1. If the answer is positive (YES), both an electric motor upper limit torque TRQMOTLH and the electric motor required torque TRQMOTCMD are set to "0" (step S54). Thereby, the electric motor rotation number NMOT (vehicle speed VP) starts to decrease.

If the answer to step S53 is negative (NO), it is determined whether or not the electric motor upper limit torque TRQMOTLH is "0" (step S55). When the answer to step S53 is negative (NO) after executing step S54, the answer to step S55 is positive (YES) and the processing proceeds to step S56, at which it is determined whether the vehicle speed VP is equal to or lower than an end threshold value (hereinafter referred to as "torque limit end vehicle speed") VPDECL of the torque limit control. The torque limit end vehicle speed VPDECL is set to a speed slightly lower than a torque limit start vehicle speed VPDECH. The difference made between the torque limit start vehicle speed VPDECH and the torque limit end vehicle speed VPDECL is to prevent hunting in control. The torque limit start vehicle speed VPDECH is set to the frequency range lower limit vehicle speed VPRL corresponding to the lower limit frequency fRL of the predetermined frequency range Rf shown in FIG. 3. A torque limit start rotation number NMOTDECH corresponding to the torque limit start vehicle speed VPDECH corresponds to the lower limit rotation number NMOTRL shown in FIG. 3.

If the answer to step S56 is negative (NO), the processing ends immediately (while maintaining the setting of step S54), and the torque limit control is continued. If the answer to step S56 is positive (YES), the electric motor upper limit torque TRQMOTLH is set to a predetermined failsafe upper limit torque TRQMOTFSA (step S57). The failsafe upper limit torque TRQMOTFSA is set to a value smaller than a normal control upper limit torque TRQMOTNML that is applied during the normal control.

After the execution of step S57, the processing proceeds to step S58, and then the vehicle speed limit control in which the vehicle speed VP is controlled such that it does not exceed the upper limit vehicle speed VPLH is executed by setting the electric motor required torque TRQMOTCMD to a value equal to or lower than the electric motor upper limit torque TRQMOTLH. In step S58, the drive control of the electric motor 1 is performed so that the vehicle speed VP does not exceed the upper limit vehicle speed VPLH. In the present embodiment, when an abnormality (conversion operation abnormality of the converter 31 or other abnormality) is detected in the vehicle 100, in an upper limit vehicle speed setting processing (not shown), an upper limit vehicle speed change processing for changing the upper limit vehicle speed VPLH to a failsafe upper limit vehicle speed VPLHFSA is started. In the upper limit vehicle speed change processing, when the actual vehicle speed VP is higher than the failsafe upper limit vehicle speed VPLHFSA, a transient control is executed to gradually decrease the upper limit vehicle speed VPLH so that the vehicle speed VP does not change rapidly. The failsafe upper limit vehicle speed VPLHFSA is set to a vehicle speed lower than the torque limit end vehicle speed VPDECL (see FIG. 9C).

If the answer to step S55 is negative (NO), that is, if the vehicle speed VP at the time when the conversion operation abnormality flag FDCFSA is set to "1" is equal to or lower than the torque limit start vehicle speed VPDECH, the processing immediately proceeds to step S57, and the electric motor upper limit torque TRQMOTLH is set to the failsafe upper limit torque TRQMOTFSA to execute the vehicle speed limit control (step S58).

Figure 9A:
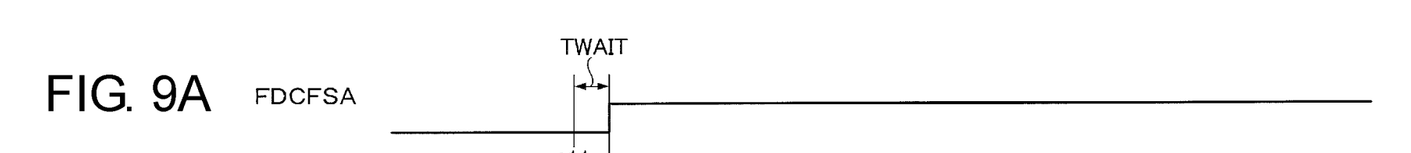
FIGS. 9A-9D are time charts showing an example of control operation according to the control processing of FIG. 8.
Figure 9B:
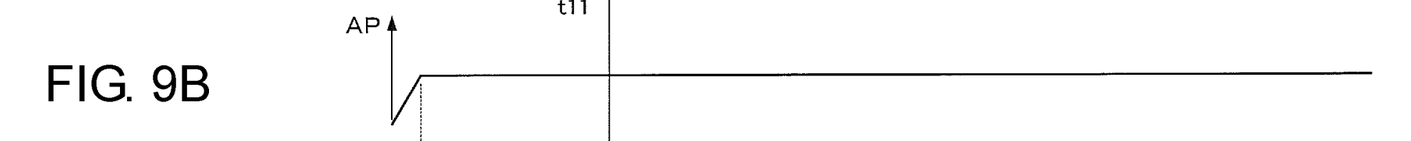
Figure 9C:
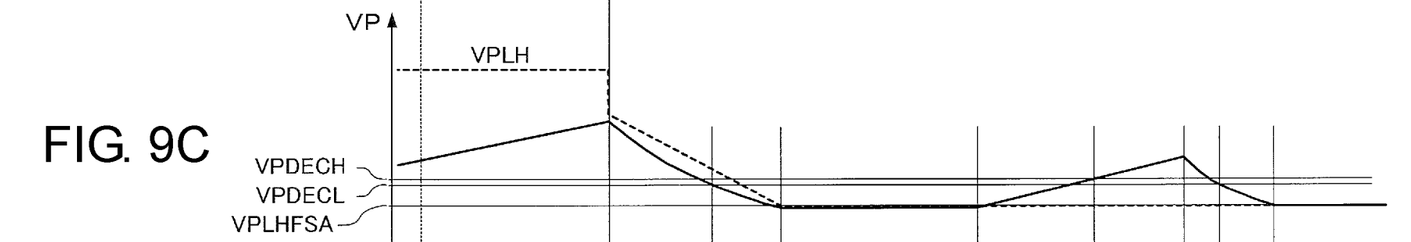
Figure 9D:
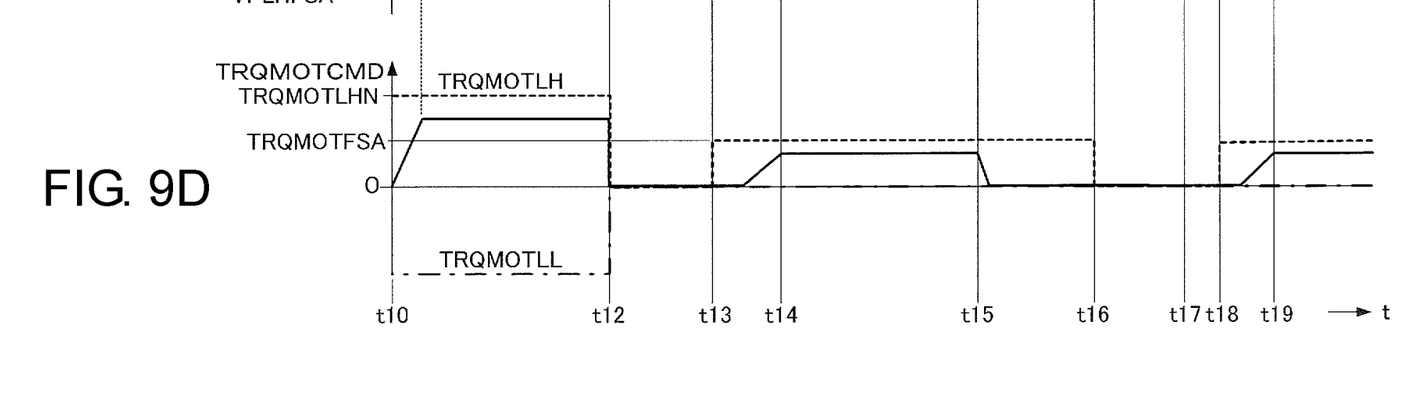

FIGS. 9A-9D are time charts showing an example of a control operation according to the control processing of FIG. 8 and shows transitions of the conversion operation abnormality flag FDCFSA, the accelerator pedal operation amount AP, the vehicle speed VP, and the electric motor required torque TRQMOTCMD. The broken line in FIG. 9C shows a transition of the upper limit vehicle speed VPLH, the broken line in FIG. 9D shows a transition of the electric motor upper limit torque TRQMOTLH, and the dashed-dotted line in FIG. 9D shows a transition of the electric motor lower limit torque TRQMOTLL.

When starting stepping on the accelerator pedal at a time t10, the electric motor required torque TRQMOTCMD increases in the same manner as the accelerator pedal operation amount AP, and the vehicle speed VP increases. At a time t11, a converter related failure is detected, and at a time t12 after a predetermined waiting time TWAIT has elapsed, the conversion operation abnormality flag FDCFSA is set to "1." At that time, since the vehicle speed VP is higher than the torque limit start vehicle speed VPDECH, the electric motor upper limit torque TRQMOTLH, the electric motor lower limit torque TRQMOTLL, and the electric motor required torque TRQMOTCMD are all set to "0." At this time, in the upper limit vehicle speed setting processing (not shown), the transient control that gradually decreases the upper limit vehicle speed VPLH toward the failsafe upper limit vehicle speed VPLHFSA is started so that the actual vehicle speed VP is not changed rapidly.

Since the vehicle speed VP gradually decreases since the time t12 and is lower than the torque limit end vehicle speed VPDECL at a time t13, the electric motor upper limit torque TRQMOTLH is set to the failsafe upper limit torque TRQMOTFSA, and the vehicle speed limit control for controlling the vehicle speed VP such that it does not exceed the upper limit vehicle speed VPLH is started. Since the accelerator pedal remains being stepped on, when the vehicle speed VP decreases to the upper limit vehicle speed VPLH (time t14), the upper limit vehicle speed VPLH (=VPLHFSA) is maintained as it is.

Since the vehicle 100 starts downhill traveling of traveling downhill from a time t15, the vehicle speed VP starts to gradually increase and the electric motor required torque TRQMOTCMD decreases to "0." Since the vehicle speed VP exceeds the torque limit start vehicle speed VPDECH at a time t16, the electric motor upper limit torque TRQMOTLH is set to "0" and the electric motor required torque TRQMOTCMD is maintained at "0." Since the downhill traveling ends at a time t17 and the vehicle speed VP is lower than the torque limit end vehicle speed VPDECL at a time t18, the electric motor upper limit torque TRQMOTLH is set to the failsafe upper limit torque TRQMOTFSA, and the vehicle speed limit control for controlling the vehicle speed VP such that it does not exceed the upper limit vehicle speed VPLH is started.

According to the processing of FIG. 8 as described above, in a case that the conversion operation abnormality of the converter 31 has occurred, when the vehicle speed VP exceeds the torque limit start vehicle speed VPDECH, in other words, when the electric motor rotation number NMOT exceeds the torque limit start rotation number NMOTDECH (=kM. VPDECH), the torque limit control for limiting the output torque of the electric motor 1 is executed. Since the torque limit start rotation number NMOTDECH is set to the lower limit rotation number NMOTRL corresponding to the lower limit frequency fRL of the predetermined frequency range Rf in which there is a high likelihood of electrical resonance occurring in the converter 31 when the conversion operation abnormality occurs, the electrical resonance in the converter 31 can be avoided and the current flowing through the first inverter 32 can be prevented from becoming excessive while securing the operation of the motor 1 at a rotation number lower than the torque limit start rotation number NMOTDECH.

Also, since the regenerative power generation by the electric motor 1 is prohibited when the conversion operation abnormality occurs in the converter 31, a high DC voltage output from the first inverter 32 due to the regenerative power generation can be prevented from being applied to the high voltage battery 4.

Also, when the conversion operation abnormality of the converter 31 has occurred, the electric motor 1 is controlled such that the vehicle speed VP becomes equal to or lower than the failsafe upper limit vehicle speed VPLHFSA. Since the failsafe upper limit vehicle speed VPLHFSA is set to be lower than the torque limit start vehicle speed VPDECH, in a case that the conversion operation abnormality of the converter 31 has occurred, when the electric motor rotation number NMOT is higher than the torque limit start rotation number NMOTDECH, the electric motor rotation number NMOT can be reduced until it becomes lower than the torque limit start rotation number NMOTDECH by the torque limit control, and thus the vehicle 100 can be driven while maintaining the vehicle speed VP near the failsafe upper limit vehicle speed VPLHFSA.

Also, in a case that the conversion operation abnormality has occurred, when the electric motor rotation number NMOT exceeds the torque limit start rotation number NMOTDECH, the electric motor rotation number NMOT is reduced by immediately setting the electric motor output torque to "0." By applying this control method, control logic of the control device can be simplified.

Modified Example

Figure 10:
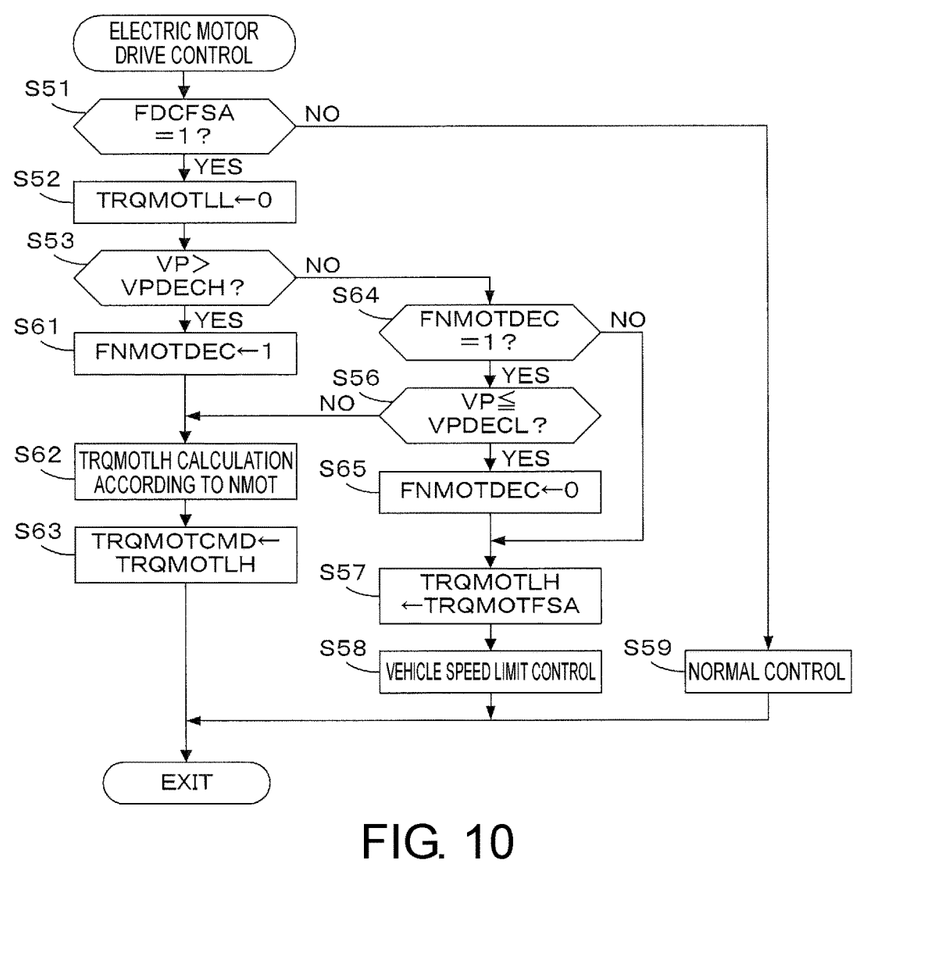
FIG. 10 is a flowchart showing a modified example of the processing shown in FIG. 8.

FIG. 10 is a flowchart showing a modified example of the processing shown in FIG. 8, and in this modified example, steps S54 and S55 of FIG. 8 are deleted and steps S61 to S65 are added.

Figure 11:
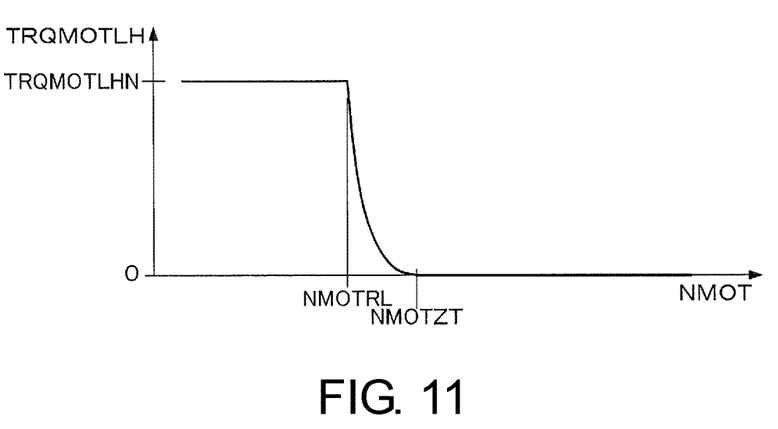
FIG. 11 is a diagram showing a table referred to in the processing of FIG. 10.

If the answer to step S53 is positive (YES), the processing proceeds to step S61, and a torque limit control flag FNMOTDEC is set to "1." An initial value of the torque limit control flag FNMOTDEC is set to "0." In step S62, a TRQMOTLH table shown in FIG. 11 is retrieved according to the electric motor rotation number NMOT and the electric motor upper limit torque TRQMOTLH is calculated. In a range in which the electric motor rotation number NMOT is higher than the lower limit rotation number NMOTRL and lower than a predetermined electric motor rotation number NMOTZT, the TRQMOTLH table is set so that the electric motor upper limit torque TRQMOTLH decreases as the electric motor rotation number NMOT increases, in other words, set so that an amount of torque reduction from a normal control upper limit torque NMOTHLN increases, and the electric motor upper limit torque TRQMOTLH is set to "0" in a range of the predetermined electric motor rotation number NMOTZT or higher.

In step S63, the electric motor required torque TRQMOTCMD is set to the electric motor upper limit torque TRQMOTLH calculated in step S62. If the answer to step S53 is negative (NO), the processing proceeds to step S64 to determine whether or not the torque limit control flag FNMOTDEC is "1." If the answer is negative (NO), the processing immediately proceeds to step S57. If the answer to step S64 is positive (YES), the processing proceeds to step S56, and if the answer thereto is negative (NO), the processing proceeds to step S62. If the answer to step S56 is positive (YES), the torque limit control flag FNMOTDEC is set to "0" (step S65), and the processing proceeds to step S57.

According to the modified example, in a case that the conversion operation abnormality of the converter 31 has occurred, when the electric motor rotation number NMOT exceeds the torque limit start rotation number NMOTDECH (=NMOTRL), the electric motor required torque TRQMOTCMD is reduced according to the electric motor rotation number NMOT and the electric motor rotation number NMOT is reduced. Even when the electric motor rotation number NMOT exceeds the torque limit start rotation number NMOTDECH, since the electrical resonance can be avoided without lowering the electric motor required torque TRQMOTCMD to "0" when a difference between the electric motor rotation number NMOT and the torque limit start rotation number NMOTDECH is small, by reducing the electric motor required torque TRQMOTCMD in accordance with the electric motor rotation number NMOT, the electrical resonance in the converter 31 can be avoided with a minimum necessary torque reduction.

In the embodiment described above, the electric motor 1 and the generator 2 correspond to the "rotary electric machine," and the high voltage battery 4, the PCU 3 and the ECU 10 constitute the control device of the rotary electric machine.

The disclosure is not limited to the embodiment described above, and various modifications can be made. For example, in the embodiment described above, a condition (step S22 in FIG. 5) under which the rotation number reduction control of the generator 2 is executed is determined by the engine rotation number NE, but the condition may be determined by the generator rotation number NGEN. Also, although a condition for executing the torque limit control of the electric motor 1 (steps S53 and S56 in FIG. 8) is determined by the vehicle speed VP, the condition may be determined by the electric motor rotation number NMOT.

Also, in the embodiment described above, an example in which the output shaft 21 of the electric motor 1 drives the drive wheels 23 via the differential gear 22 has been described, but the disclosure is also applicable to a case that in which a transmission mechanism or a gear mechanism with a fixed gear ratio is provided between the output shaft 21 and the differential gear 22. Also, in the embodiment described above, an example in which the input shaft 24 of the generator 2 is directly driven by the engine 25 has been described, but the disclosure is also applicable to a case in which the engine 25 has a configuration of driving the input shaft 24 via a gear mechanism.

Further, the disclosure is applicable not only to rotary electric machines mounted on vehicles, but also to control devices of rotary electric machines for other applications.

Other Configurations

In view of above, a first aspect of the disclosure is a control device of a rotary electric machine including a battery 4, an inverter 32 converting a direct current (DC) power supplied from the battery 4 into an alternating current (AC) power to supply a drive power to the rotary electric machine 1, and a DC voltage converter 31 provided between the battery 4 and the inverter 32. In a case that the DC voltage converter 31 stops a conversion operation and a conversion operation abnormality in which input and output voltages become equal occurs, when a rotation speed NMOT of the rotary electric machine exceeds a predetermined rotation speed NMOTDECH, a torque limit control that limits an output torque TRQMOTCMD of the rotary electric machine is executed. And, the predetermined rotation speed NMOTDECH is set to a rotation speed NMOTRL corresponding to a lower limit frequency fRL of a predetermined frequency range Rf in which there is a high likelihood of an electrical resonance occurring in the DC voltage converter 31 when the conversion operation abnormality occurs.

According to this configuration, in a case that the conversion operation abnormality of the DC voltage converter occurs, when the rotation speed of the rotary electric machine exceeds the predetermined rotation speed, the torque limit control for limiting the output torque of the rotary electric machine is executed. Since the predetermined rotation speed is set to the rotation speed corresponding to the lower limit frequency of the predetermined frequency range in which there is a high likelihood of the electrical resonance occurring in the DC voltage converter when the conversion operation abnormality occurs, the electrical resonance in the DC voltage converter can be avoided and a current flowing through the inverter can be prevented from becoming excessive while securing an operation of the rotary electric machine at a rotation speed lower than the predetermined rotation speed.

In a second aspect of the disclosure, in the control device of the rotary electric machine according to the first aspect, the rotary electric machine 1 may be used as a drive source for driving a vehicle 100 and perform a regenerative power generation using kinetic energy of the vehicle 100, and a power obtained by the regenerative power generation may be able to be applied to charge the battery 4 via the inverter 32, and the regenerative power generation may be prohibited when the conversion operation abnormality occurs.

According to this configuration, since the regenerative power generation by the rotary electric machine is prohibited when the conversion operation abnormality occurs, a high DC voltage output from the inverter due to the regenerative power generation can be prevented from being applied to the battery.

In a third aspect of the disclosure, in the control device of the rotary electric machine according to the second aspect, when a predetermined abnormality including the conversion operation abnormality occurs in the vehicle 100, the rotary electric machine may be controlled so that a traveling speed VP of the vehicle becomes equal to or lower than a predetermined upper limit vehicle speed VPLHFSA, and the predetermined upper limit vehicle speed VPLHFSA may be set to be lower than the traveling speed VPDECH of the vehicle corresponding to the predetermined rotation speed NMOTDECH.

According to this configuration, when the conversion operation abnormality of the DC voltage converter occurs, the rotary electric machine is controlled such that the traveling speed of the vehicle becomes equal to or lower than the predetermined upper limit vehicle speed. Since the predetermined upper limit vehicle speed is set to be lower than the vehicle traveling speed corresponding to the predetermined rotation speed for determining whether or not to perform the torque limit control, in a case that the conversion operation abnormality of the DC voltage converter 31 occurs, when the rotation speed of the rotary electric machine is higher than the predetermined rotation speed, the rotation speed of the rotary electric machine can be reduced until it becomes lower than the predetermined rotation speed by the torque limit control, and thus the vehicle can be driven while maintaining a traveling speed near the predetermined upper limit vehicle speed.

In a fourth aspect of the disclosure, in the control device of the rotary electric machine according to any one of the first to third aspects, the torque limit control may be executed by setting the output torque TRQMOTCMD of the rotary electric machine to "0."

According to this configuration, in a case that the conversion operation abnormality has occurred, when the rotation speed of the rotary electric machine exceeds the predetermined rotation speed, the rotation speed is reduced by setting the output torque of the rotary electric machine to "0." By applying this control method, control logic of the control device can be simplified.

In a fifth aspect of the disclosure, in the control device of a rotary electric machine according to any one of the first to third aspects, the torque limit control may be executed by reducing the output torque TRQMOTCMD of the rotary electric machine according to the rotation speed NMOT of the rotary electric machine, and a reduction amount of the output torque may be increased as the rotation speed NMOT grows higher.

According to this configuration, in a case that the conversion operation abnormality has occurred, when the rotation speed of the rotary electric machine exceeds the predetermined rotation speed, the rotation speed is reduced by reducing the output torque of the rotary electric machine according to the rotation speed of the rotary electric machine. Even when the rotation speed of the rotary electric machine exceeds the predetermined rotation speed, since electrical resonance can be avoided without lowering the output torque to "0" when a difference between the actual rotation speed and the predetermined rotation speed is small, by reducing the output torque of the rotary electric machine in accordance with the rotation speed of the rotary electric machine, electrical resonance in the DC voltage converter can be avoided with a minimum necessary torque reduction.

A sixth aspect of the disclosure is a control device of a rotary electric machine including an inverter 33 converting an alternating current AC power generated by the rotary electric machine 2 having a power generation function into a direct current DC power, a battery 4 chargeable by the DC power output from the inverter 33, and a DC voltage converter 31 provided between the battery 4 and the inverter 33. In a case that the DC voltage converter 31 stops a conversion operation and a conversion operation abnormality in which input and output voltages become equal occurs, when a rotation speed NGEN of the rotary electric machine exceeds a predetermined rotation speed NETHR, a rotation speed reduction control that reduces the rotation speed NGEN of the rotary electric machine is executed, and the predetermined rotation speed NETHR is set to a rotation speed NMOTRL corresponding to a lower limit frequency fRL of a predetermined frequency range Rf in which there is a high likelihood of an electrical resonance occurring in the DC voltage converter when the conversion operation abnormality occurs.

According to this configuration, in a case that the conversion operation abnormality of the DC voltage converter has occurred, when the rotation speed of the rotary electric machine exceeds the predetermined rotation speed, rotation speed reduction control that reduces the rotation speed of the rotary electric machine is executed. Since the predetermined rotation speed is set to a rotation speed corresponding to the lower limit frequency of the predetermined frequency range in which there is a high likelihood of the electrical resonance occurring in the DC voltage converter when the conversion operation abnormality occurs, the electrical resonance in the DC voltage converter can be avoided and a current flowing through the inverter can be prevented from becoming excessive while securing the operation of the rotary electric machine at a rotation speed lower than the predetermined rotation speed.

In a seventh aspect of the disclosure, in the control device of the rotary electric machine according to the sixth aspect, the rotary electric machine 2 may be configured to be able to generate power by being rotationally driven by an internal combustion engine 25 and may include an engine control unit for controlling a rotation speed NE of the internal combustion engine so that the rotation speed NGEN of the rotary electric machine does not exceed the predetermined rotation speed NETHR when the conversion operation abnormality occurs. According to this configuration, the rotary electric machine is driven by an internal combustion engine to perform the power generation. Since the rotation speed of the internal combustion engine is controlled so that the rotation speed of the rotary electric machine does not exceed the predetermined rotation speed, the rotation speed of the rotary electric machine is prevented from exceeding the predetermined rotation speed again after the rotation speed of the rotary electric machine becomes equal to or lower than the predetermined rotation speed after the conversion operation abnormality has occurred.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device of a rotary electric machine, comprising:
    a battery;
    an inverter, converting a direct current (DC) power supplied from the battery into an alternating current (AC) power to supply a drive power to the rotary electric machine; and
    a DC voltage converter, provided between the battery and the inverter,
    wherein in a case that the DC voltage converter stops a conversion operation and a conversion operation abnormality in which input and output voltages become equal occurs, when a rotation speed of the rotary electric machine exceeds a predetermined rotation speed, a torque limit control that limits an output torque of the rotary electric machine is executed, and
    the predetermined rotation speed is set to a rotation speed corresponding to a lower limit frequency of a predetermined frequency range in which there is a high likelihood of an electrical resonance occurring in the DC voltage converter when the conversion operation abnormality occurs.

2. The control device according to claim 1, wherein the rotary electric machine is used as a drive source for driving a vehicle and performs a regenerative power generation using kinetic energy of the vehicle, and a power obtained by the regenerative power generation is able to be applied to charge the battery via the inverter, and
    the regenerative power generation is prohibited when the conversion operation abnormality occurs.

3. The control device according to claim 2, wherein when a predetermined abnormality including the conversion operation abnormality occurs in the vehicle, the rotary electric machine is controlled in a manner that a traveling speed of the vehicle becomes equal to or lower than a predetermined upper limit vehicle speed, and
    the predetermined upper limit vehicle speed is set to be lower than the traveling speed of the vehicle corresponding to the predetermined rotation speed.

4. The control device according to claim 3, wherein the torque limit control is executed by setting the output torque of the rotary electric machine to "0."

5. The control device according to claim 1, wherein the torque limit control is executed by setting the output torque of the rotary electric machine to "0."

6. The control device of a rotary electric machine according to claim 1, wherein the torque limit control is executed by reducing the output torque of the rotary electric machine according to the rotation speed of the rotary electric machine, and a reduction amount of the output torque is increased as the rotation speed grows higher.

7. The control device according to claim 2, wherein the torque limit control is executed by setting the output torque of the rotary electric machine to "0."

8. The control device of a rotary electric machine according to claim 2, wherein the torque limit control is executed by reducing the output torque of the rotary electric machine according to the rotation speed of the rotary electric machine, and a reduction amount of the output torque is increased as the rotation speed grows higher.

9. The control device of a rotary electric machine according to claim 3, wherein the torque limit control is executed by reducing the output torque of the rotary electric machine according to the rotation speed of the rotary electric machine, and a reduction amount of the output torque is increased as the rotation speed grows higher.

10. A control device of a rotary electric machine, comprising:
    an inverter, converting an alternating current (AC) power generated by the rotary electric machine having a power generation function into a direct current (DC) power;
    a battery chargeable by the DC power output from the inverter; and
    a DC voltage converter provided between the battery and the inverter,
    wherein in a case that the DC voltage converter stops a conversion operation and a conversion operation abnormality in which input and output voltages become equal occurs, when a rotation speed of the rotary electric machine exceeds a predetermined rotation speed, a rotation speed reduction control that reduces the rotation speed of the rotary electric machine is executed, and
    the predetermined rotation speed is set to a rotation speed corresponding to a lower limit frequency of a predetermined frequency range in which there is a high likelihood of an electrical resonance occurring in the DC voltage converter when the conversion operation abnormality occurs.

11. The control device according to claim 10, wherein the rotary electric machine is configured to be able to generate a power by being rotationally driven by an internal combustion engine and includes an engine control unit for controlling a rotation speed of the internal combustion engine in a manner that the rotation speed of the rotary electric machine does not exceed the predetermined rotation speed when the conversion operation abnormality occurs.

* * * * *